United States Patent [19] [11] 3,953,731
Forsen [45] Apr. 27, 1976

[54] ISOTOPE SEPARATION UTILIZING ZEEMAN COMPENSATED MAGNETIC EXTRACTION

[75] Inventor: Harold K. Forsen, Bellevue, Wash.

[73] Assignee: Jersey Nuclear-Avco Isotopes, Inc., Bellevue, Wash.

[22] Filed: Dec. 27, 1973

[21] Appl. No.: 428,660

[52] U.S. Cl. ............................ 250/290; 250/281; 250/283; 250/288; 250/298
[51] Int. Cl.² .................................... H01J 39/34
[58] Field of Search .......... 250/251, 281, 283, 288, 250/290, 298, 299, 300, 425

[56] References Cited
UNITED STATES PATENTS

| | | | |
|---|---|---|---|
| 2,938,116 | 5/1960 | Benson et al. | 250/287 |
| 3,174,034 | 3/1965 | Behrisch et al. | 250/293 |
| 3,294,970 | 12/1966 | Jenckel | 250/423 |
| 3,443,087 | 5/1969 | Robieux et al. | 250/290 |
| 3,478,204 | 11/1969 | Brubaker et al. | 250/423 |
| 3,772,519 | 11/1973 | Levy et al. | 250/288 |

Primary Examiner—James W. Lawrence
Assistant Examiner—B. C. Anderson
Attorney, Agent, or Firm—Weingarten, Maxham & Schurgin

[57] ABSTRACT

In a system for isotope separation wherein a plasma of ions of one isotope type is created, method and apparatus for magnetically extracting the ions from the plasma without impairing the ionization selectivity and efficiency. In a particle flow of plural isotope types, radiant energy is applied to selectively excite and ionize ions of at least one isotope type without corresponding ionization of particles of other isotope types. A magnetic field is applied to divert the ions of the one isotope type sufficiently to permit separate collection of those ions without the other particle constituents of the flow. The system of the present invention balances the requirements for a high magnetic field to provide sufficient diversion before charge exchange with the requirement for a limited magnetic field to prevent interference with the selective ionization process due to Zeeman broadening of the isotope absorption lines.

25 Claims, 8 Drawing Figures

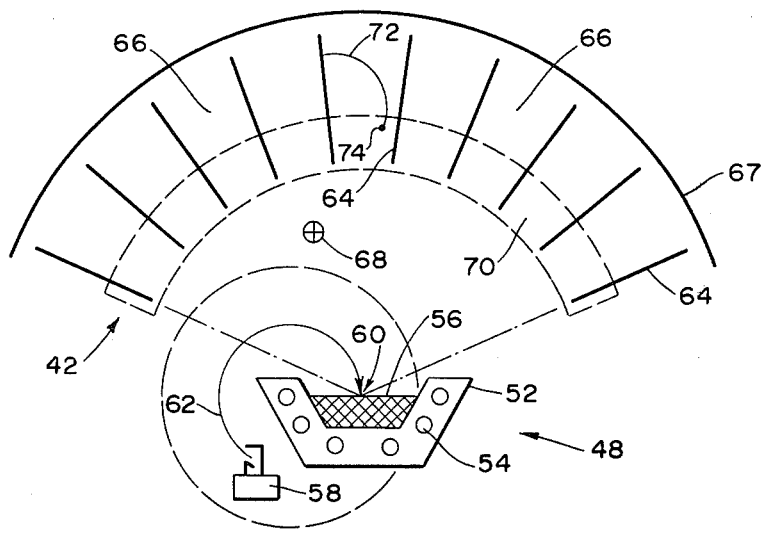
FIG. 2
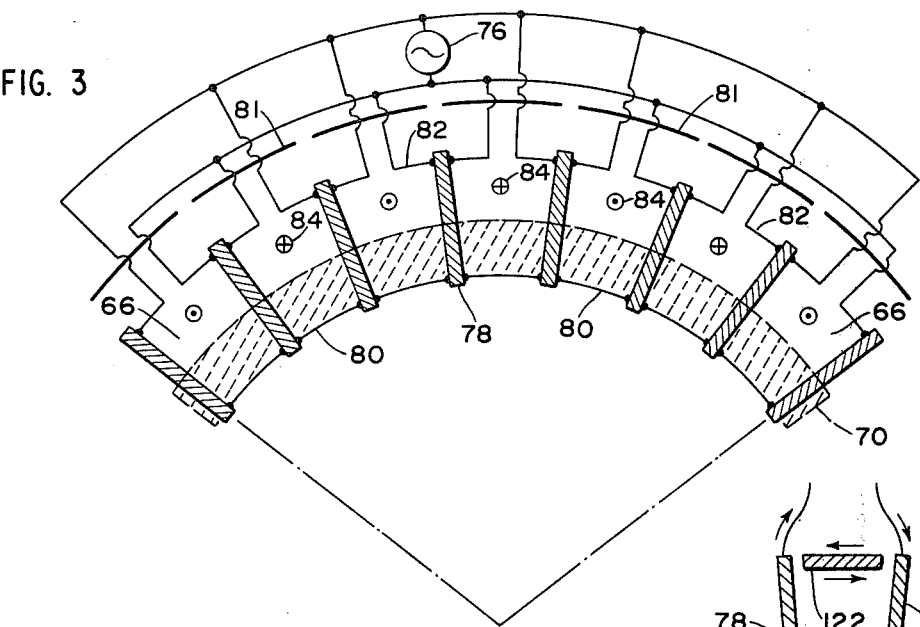
FIG. 3
FIG. 3A
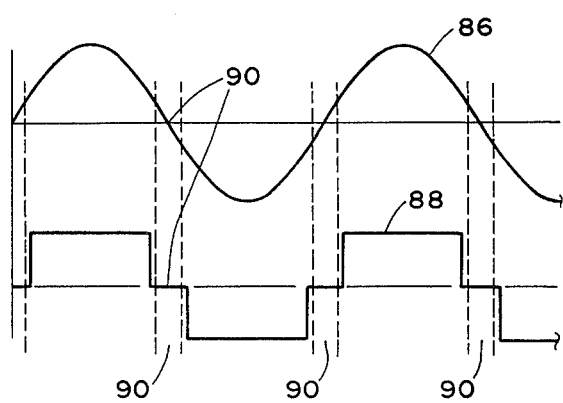
FIG. 4

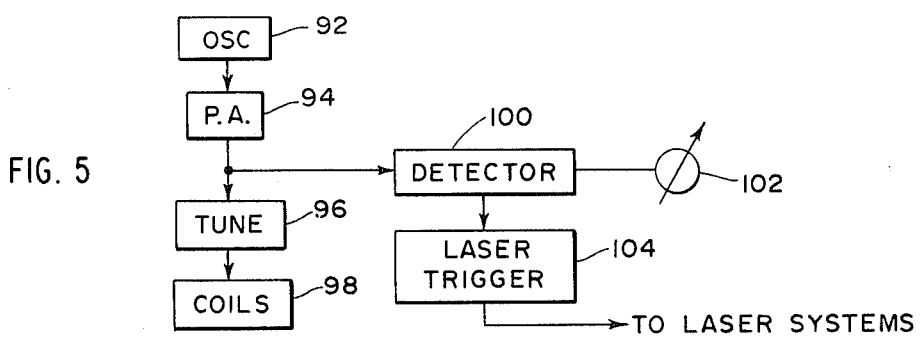
FIG. 5
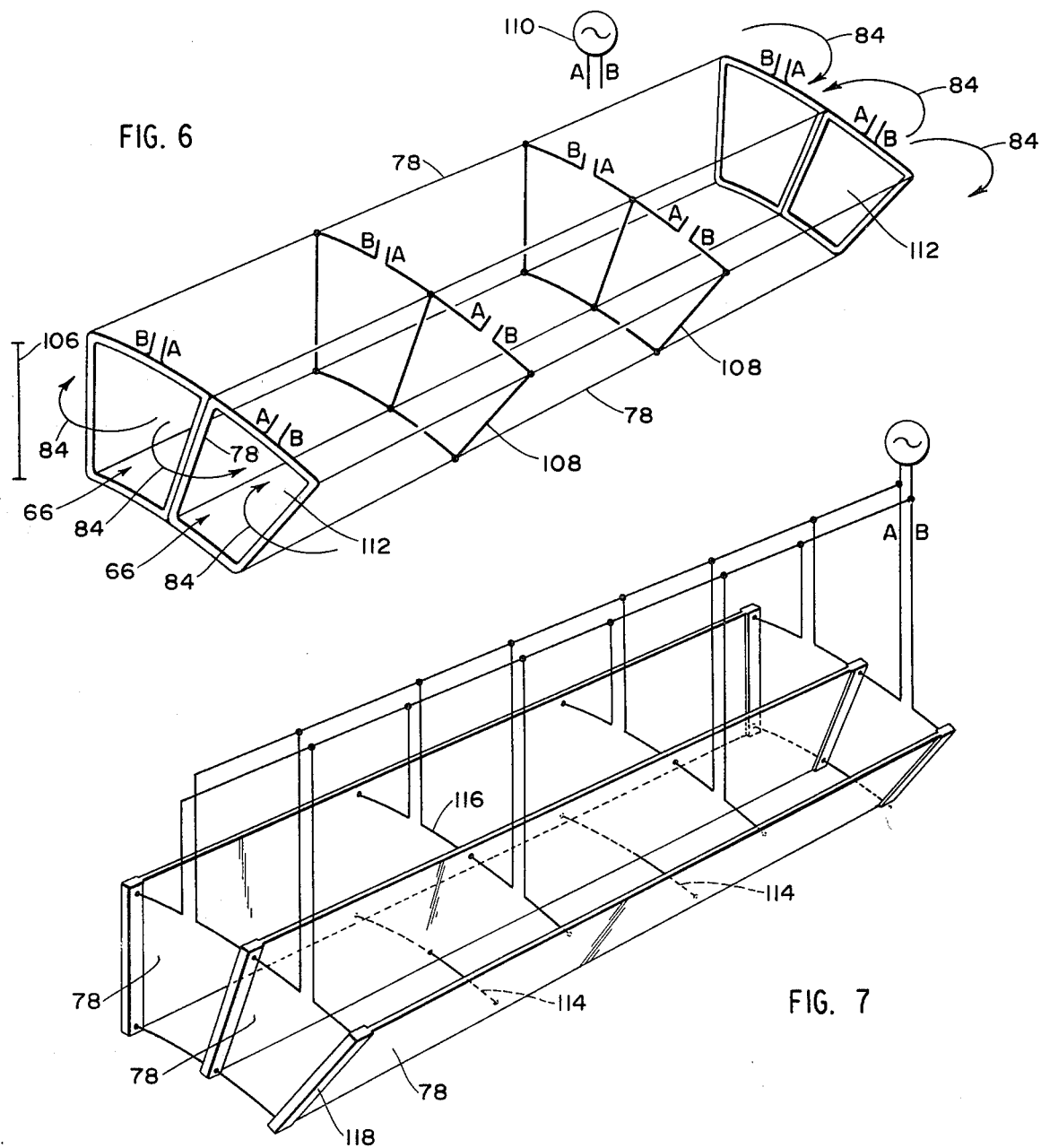
FIG. 6
FIG. 7

ISOTOPE SEPARATION UTILIZING ZEEMAN COMPENSATED MAGNETIC EXTRACTION

FIELD OF THE INVENTION

This invention relates to isotope separation and in particular to a system for magnetic separation of selectively ionized isotopes.

BACKGROUND OF THE INVENTION

A new technique for uranium enrichment, specifically enrichment of the $U_{235}$ isotope, is shown in co-pending application Ser. No. 25,605, filed Mar. 25, 1970, and in corresponding French Pat. No. 71.14007, Jan. 10, 1971, both incorporated herein by reference. The system there disclosed operates by generating a vapor of uranium metal which expands as a predetermined particle flow. The $U_{235}$ isotope is selectively ionized by application of narrow band precisely tuned laser radiation to selectively excite and ionize only the $U_{235}$ isotope without substantial ionization of the $U_{238}$ isotopes. Once ionized, the ions of the $U_{235}$ isotope are separated from the neutrals by deflecting their flow through the application of a pulsed electric and continuous magnetic field which produce cross-field magnetohydrodynamic forces on the electrons and ions. The different trajectory of these ions resulting from the crossed-field acceleration permits their collection apart from the remaining constituents of the vapor flow.

If it is desired to use only a magentic field to separate the selectively ionized particles from the plasma, additional factors must be taken into consideration for an efficient enrichment scheme. In particular, it is desired to use a high density vapor flow in order to increase the quantity of particles which are separated. The increasing density predicts a reduction in the charge exchange time for the selectively ionized particles which, in turn, indicates a higher or stronger magnetic field in order to deflect the flowing ions by a predetermined angle before they lose their charge and are neutralized to be no longer affected by the magnetic field. A strong magnetic field, however, increases the Zeeman splitting or broadening of the absorption lines for each isotope thereby reducing the efficiency or selectivity of the excitation and ionization produced by the laser radiation.

BRIEF SUMMARY OF THE INVENTION

In accordance with the present invention, a system is presented for providing magnetic separation of selectively ionized particles of one isotope type in a vapor flow environment of plural isotope types. A magnetic force field alone is employed to provide sufficient separation of the selectively ionized particles of the one isotope type at relatively high particle density levels and without substantial loss in ionization selectivity resulting from Zeeman splitting in the particle absorption lines.

In particular implementation and in association with a system for uranium $U_{235}$ enrichment, a vapor flow of elemental uranium is directed into a region where narrow band, tuned laser radiation is repeatedly applied to provide at least two energy step selective ionization of the $U_{235}$ isotope in the vapor flow. A magnetic field is applied in the region of the ionized $U_{235}$ which creates a Lorentz force on the moving ions directing them toward one of a plurality of collection plates placed generally parallel to the vapor flow to permit collection of the $U_{235}$ particles in substantially enriched proportions as compared to the concentration in the vapor flow generally. To prevent a broadening of the absorption lines for both the $U_{235}$ and $U_{238}$ isotopes in the vapor flow from the applied magnetic field and thus prevent substantial reduction in the selectivity of the excitation and ionization, the magnetic field is preferably applied in a time varying magnitude which is phased with respect to the repetitive application of laser radiation to provide a relatively low field strength and corresponding small Zeeman splitting during selective excitation and ionization of the $U_{235}$ particles.

BRIEF DESCRIPTION OF THE DRAWINGS

These and other features of the present invention are more fully described below in a detailed description of the preferred embodiment presented for the purposes of illustration and not by way of limitation, and in the accompanying drawings of which:

FIG. 2 is an internal sectional diagram of a portion of FIG. 1, useful in explaining the considerations which led to the present invention;

FIG. 3 is a modified diagrammatic representation of a portion of FIG. 2 illustrating features of the present invention;

FIG. 3A presents an alternative form for FIG. 3;

FIG. 4 is a waveform diagram useful in explaining the present invention;

FIG. 5 is an electonric block diagram of apparatus associated with the apparatus of FIGS. 1 and 3;

FIG. 6 is a diagrammatic representation of means for applying the magnetic field in the present invention; and FIG. 7 is a modified representation of means for applying the magnetic field in the present invention.

DETAILED DESCRIPTION OF THE PREFERRED EMBODIMENT

Figure 1:
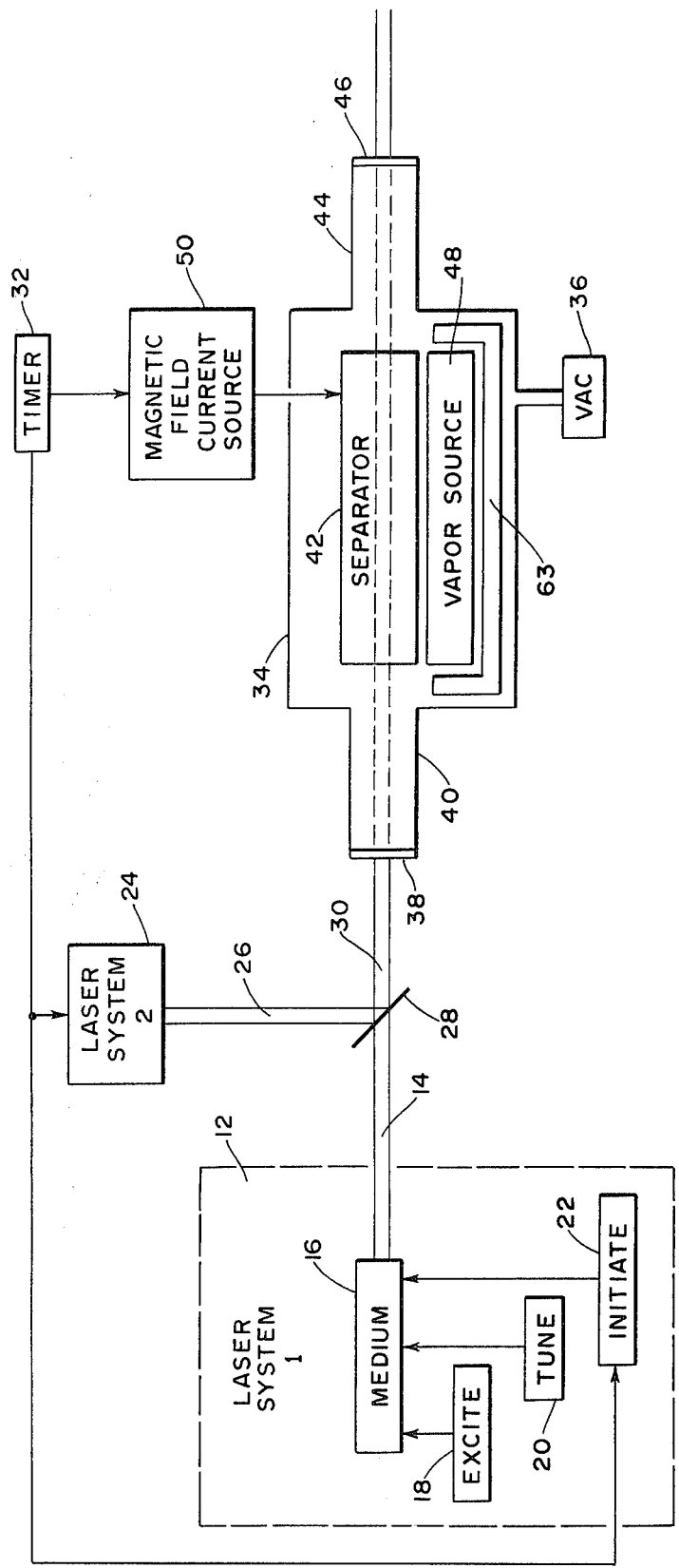
FIG. 1 is a diagrammatic representation of apparatus for selective isotope ionization and separation according to the present invention.

The present invention contemplates the use of a magnetic field alone, applied to a plasma flow of selectively ionized isotope particles (atoms or molecules), to separate the ions of that isotope type without impairing the ionization selectivity. In understanding the system of the present invention, it is useful to consider the apparatus with which it is associated for generating a vapor flow of, in the preferred application to uranium enrichment, elemental uranium atoms and for providing isotopically selective ionization of the $U_{235}$ isotope in the vapor flow.

For this purpose, reference is made to FIG. 1. A laser system 12 has an output beam 14 of laser radiation from a lasing medium 16, typically a dye solution. The beam 14 is tuned to a predetermined frequency corresponding to an absorption line for the $U_{235}$ isotope and maintained with a narrow bandwidth, using an etalon filter where necessary, so as not to excite $U_{238}$ particles through a neighboring absorption line. The lasing medium 16 in laser system 12 has associated with it an excitation system 18 to provide the population inversion for lasing of the medium 16, a tuning system 20 which may include typical components of a laser cavity and a laser pulse initiating system 22 to commence each output pulse of laser radiation in beam 14. The duration of radiation in each pulse of beam 14 may typically range from approximately a few nanoseconds to a significant fraction of a microsecond. To achieve this laser function, the laser system 12 may typically comprise one of the Dial-A-Line lasers of the Avco Everett Research Laboratory, Inc., Everett, Massachusetts, and may further include one or more stages of amplification.

A second laser system 24, which may be similar to system 12 or may include a laser having a more intense output, provides an output beam 26 which is combined with beam 14 in a dichroic mirror 28, or by a prism, to provide a composite output beam 30, composed of the radiations in both beams 14 and 26. The pulses in beams 14 and 26 may be applied simultaneously or sequentially at repeated intervals by activation of the laser systems 16 and 24 from a timer 32.

The frequencies of radiation in the laser beams 14 and 26 are selected such that the particles of $U_{235}$ to be selectively ionized are first excited by interaction with photons in the beam 14 at a precise $U_{235}$ absorption line. An appropriate absorption line may be found from lists in the known literature. Subsequently, the excited particles may be directly ionized through interaction with another photon in beam 26 or excited one or more additional times before ionization. For whatever energy step scheme is employed for ionization of the $U_{235}$ particles in this manner, it is desirable that the sum of the photon energies employed exceed the ionization potential of $U_{235}$.

Ionization is achieved within a chamber 34 which is maintained in a low pressure condition by a vacuum pump 36 and to which the radiation in beam 30 is applied through a window 38 and long pipe 40 to prevent a contamination of the window 38. The beam 30 in passing through the chamber 34 is directed through an ion separator 42 and exits on a second pipe 44 through a further window 46. Beam 30 may be used in one or more additional chambers to provide more complete utilization of the energy in the beam. In typical application, a vapor of elemental uranium is generated as an expanding flow from a vapor source 48 and directed into the ion separator 42 for separation of the selectively ionized $U_{235}$ using magnetic field or Lorentz forces alone. To avoid Zeeman splitting, a specific configuration may be used or the magnetic field is preferably generated in timed relationship to the pulses in laser beam 30 by signals from timer 32 applied to a magnetic field current source 50 which, in turn, generates the magnetic field through coils in the separator 42 as will be shown below. Further features of the apparatus may be shown with reference to FIG. 2.

In FIG. 2, the vapor source 48 is shown to include a crucible 52 having cooling ports 54 and containing a mass 56 of elemental uranium. An electron beam source 58, which may include a heated filament, provides an energetic electron beam which is focused onto the surface of the uranium mass 56 to provide local vaporization typically in a long line 60 or series of spots throughout the length of the trough formed by crucible 52. A magnetic field 68 used for focusing the beam 62 may also be applied in the region of the ion separator 42 into which the radially expanding vapor flow from the line source 60 is applied, or separate, isolated fields may be provided. A field path 63 in FIG. 1 may be used to contain the focusing field in the vapor source and to further isolate the two field regions. Shielding may be used between the two regions. The vapor flow enters the separator 42 between a plurality of collection plates 64 placed generally parallel to the vapor flow within the separator. The collection plates 64 divide the ion separator into a plurality of chambers 66.

The magnetic field 68 which may be employed to focus the electron beam 62, may extend throughout the region of the chambers 66. There generally will be no force upon the neutral vapor particles in the vapor flow from the magnetic field 68 until selective ionization of $U_{235}$ particles from the laser radiation is achieved. It is desirable to apply the laser radiation in a partial cylindrical band 70 throughout the portion of the chambers 66 which first receive the vapor flow. The ions created in the region 70 will experience a deflection or change in direction resulting from the Lorentz force onto a typical curve 72 of radius determined by the strength of the field 68. The neutral particles will continue on paths toward a rear collection plate 67.

In considering the use of such a system for the production of commerical quantities of enriched uranium $U_{235}$, it is important to provide a substantial density of uranium particles in the vapor flow directed to the separator 42, particularly where vapor velocities may be relatively low. Such high particle densities, however, will have the effect of reducing the charge exchange distance, the length of travel for ionized particles before an electron exchange collision with a neutral particle, generally $U_{238}$ because of its abundance, results in a loss of the charge of the ion and imparts a charge to the neutral particle. It is thus important to insure that sufficient deflection of the ionized $U_{235}$ is achieved before a substantial number of charge exchange reactions occur, not only to insure that the $U_{235}$ particle will be deflected for separate collection on the plates 64, but to insure that a minimum of $U_{238}$ particles are deflected and collected on the plates 64.

To apply a quantitative standard, an arbitrary angular change in direction, such as 45°, may be selected as the deflection which is to be achieved before charge exchange. By close spacing of the plates 64 and suitably elongating them beyond the ionization region 70, a worst case ionization point such as 74 can still be assured to result in a particle trajectory that will produce collection on one of the plates 64. It is, of course, apparent that the greater the deflection before charge exchange, the greater the separation and accordingly the higher the efficiency of the enrichment system. Forty-five degrees is selected for purposes of illustration as a useful criteria. With this in mind, and resorting to well-known theory, it is predicted that the strength of the field 68 used should be greater than $$\frac{\pi}{4} \frac{mn\sigma V_r}{q} \text{, but less than } \frac{2mV_f}{qs}$$

where: n is the particle density, s is the separation of plates 64, $\sigma$ is the charge exchange cross-section, $V_r$ is the relative velocity of the particles with respect to $V_f$, the flow velocity of the particles of mass m and charge q.

It can be seen from the above expression that as the particle density or the relative velocity of vapor increases as may be desired for increasing commerical efficiency of the system, the requisite magnetic field increases as well. There is, however, a phenomenon operating to restrict the magnitude of the magnetic field for effective selective ionization. As indicated above, the efficiency of the enrichment technique depends upon the selectivity of the ionization so that substantially more $U_{235}$ is ionized than $U_{238}$. This requires not only a finely tuned, narrow bandwidth of photon energy in the applied excitation laser radiation so as to excite the particles of the $U_{235}$ isotope without exciting $U_{238}$ particles, but also requires that the absorption lines for $U_{235}$ and $U_{238}$ be separate and distinct. There is a distinct isotope shift between selected absorption lines for the two uranium isotopes in the absence of a magnetic field. In the presence of a magnetic field, however, quantum theory indicates that the excitation transitions for $U_{235}$ and $U_{238}$ may overlap and reduce the degree of selectively in the excitation and ionization to an extent depending upon the $U_{235}$ absorption line selected, the vapor temperature, and the magnetic field strength. This is the so-caled Zeeman effect.

A system of time and spacially varying magnetic fields has been developed, and is illustrated in FIGS. 3 and 4, which substantially overcomes these counteracting considerations. A current source 76 is provided to apply a time varying, axial magnetic field in the chambers 66 with the direction of the axial flux alternating from chamber to chamber. The source 76 supplies current through a coil system which includes modified plates 78 and thin wires 80 connecting the edges of the plates facing the flow, as well as further thin wires 82 connecting the opposite edges of the plates 78 to the source 76. Collection plates 81 for the neutral, generaly $U_{238}$, particles are placed beyond the chambers 66 to receive the undeflected particles. While the geometry of the coil and plate configurations will be more fully described with reference to the description of FIGS. 6 and 7, reference to FIG. 4 is made here to indicate typical waveforms for the time varying magnetic field 84 within the chambers 66. Waveforms 86 represents a generally sinusoidal, and relatively easy to provide waveform, while waveform 88 is a squarewave having a predetermined dwell time. Current from a source 76 produces the waveforms 86 or 88 for the magnetic field strength and it is synchronized to the repeated laser bursts in the beam 30 of FIG. 1 such that the magnitude of the magnetic field is at a relatively low value as at points 90 in the FIG. 4 representation, during the periods of laser illumination of the uranium vapor. In this case, the Zeeman splitting during the critical times of selective excitation and ionization is maintained at a minimum while high magnetic field may be obtained during the immediately subsequent periods to improve the efficiency of ion separation through an increased force on the travelling ions. It is apparent that the faster the magnetic field can build up, subsequent to the burst of laser radiation, the more efficient will the overall enrichment system be, at least in terms of providing ion deflection before charge exchange occurs after ionization. For this reason, a squarewave or near squarewave configuration has the benefit of a fast increase in magnetic field strength. Also, a predetermined point of termination in the magnetic field before the generation of the next laser pulse may be defined sufficiently early to insure the existence of a minimal magnetic force on the ions of $U_{238}$ created from charge exchange reactions. Faster changing magnetic fields, however, may result in the generation of spurious electric fields.

In FIG. 5, an overall synchronization system, which may be employed to control the activation of the laser systems 12 and 24 and the phasing of the magnetic field 84, is illustrated. An oscillator 92 may be used as a frequency reference for this system and its output is applied for amplification to a power amplifier 94. The output of the power amplifier 94 may optionally be tuned by a capacitor or other reactive means in a tuning system 96 for application in or near reasonance to coils 98 at increased efficiency and current. The output of the power amplifier 94 is also applied to a derector 100 which may include a control 102 to vary the phasing of output signals from the detector 100 which activate the laser pulse systems 22 through a laser trigger 104. The detector 100 may typically be a slope sensitive threshold detector as is known in the art.

The details of the coils for producing the field 84 in the chamber 66 are shown more clearly in FIGS. 6 and 7. In FIG. 6, two chambers 66 are indicated in terms of the coil structures surrounding them and the plates 78 which separate them. The plates 78 may be viewed as having a dimension 106 in the direction of vapor flow. It is desirable to place coils 108 around each chamber at distances along the length thereof separated from each other by generally no more than the dimension 106 of the plates. The coils are excited from a source 110 so as to provide a closed loop circulation of the magnetic field 84 between the adjacent chambers 66 as shown, as well as the other adjacent chambers not shown. This field looping reduces the influence of this separating field on the electron beam focusing field where a separate focusing is employed. For this purpose, A and B designations on the coils 108 indicate a possible connection with the corresponding terminals on the source 110. In order to insure that the magnetic field will circulate completely around plates 78 and not cut through the end portions thereof, the end coils such as 112 may typically include an additional number of turns, such as 10, in contrast to a single turn for coils 108.

As more clearly shown in FIG. 7, the coils have conduction paths which include the plates 78 as well as a few thin filamentary wires 114, which connect the edges of the plates at predetermined locations along their length on the edge facing the vapor flow. Similar filamentary leads 116 are employed in corresponding locations along the opposite edges of plates 78. The thin filamentary connections 114 and 116, as can be seen, will intercept a small portion of the vapor flow and it may be desirable to insure that they are sufficiently heated by the current flow to liquify the uranium and thus avoid the collection of deposits thereon. As shown in FIG. 7, it is possible to provide end portions 118 of the plates 78 which are of greater metal bulk in order to direct the flux completely around them rather than using the extra number of turns referred to above in coils 112 of FIG. 6.

In typical implementation, the coil dimension 106 may extend in length from centimeters up to a substantial fraction of a meter, the coil currents may be in the range of 10K to 100K amperes and the laser pulse and field repetition rates may be approximately 50 $KH_z$, depending upon the velocity of vapor flow and height of laser irradiation zone 70 in FIG. 2. Other dimensions are contemplated and the invention is not limited to the above examples.

As an alternative embodiment shown in FIG. 3A, the rear $U_{238}$ collection plates may be replaced by plates 122 across the outer edges of the plates 78. In this case, the leads to plates 78 do not need to loop over the ends of the chambers 66 since image currents will be induced in plates 122, as indicated by the arrows, to produce substantially the effect of a closed loop circulating current.

Having described above a preferred embodiment for the present invention, it will occur to those skilled in the art that modifications and alternatives may be employed within the spirit of the invention. Accordingly, it is intended to limit the scope of the invention only as shown in the following claims.

What is claimed is:

1. In a system for isotope separation wherein means are provided to produce isotopically selective ionization in a particle flow of plural isotope types by pulsed photoexcitation of a selected absorption line to provide an environment having ions of at least one isotope type, apparatus for changing the flow direction of the selectively ionized particles to permit separate collection thereof comprising:
   means for applying a magnetic field to the flow of particles to provide a change in the flow direction of the ionized particles therein;
   the applied magnetic field having a strength sufficient to reduce isotopic selectivity of ionization through Zeeman broadening of the selected absorption line; and
   means for periodically time varying the applied magnetic field to be relatively low during pulse photoexcitation and relatively higher thereafter thereby to diminish the reduction in selectivity of ionization.

2. The apparatus of claim 1 further including:
   a plurality of collection plates placed generally along the line of flow and in position to intercept and collect those particles changed in flow direction by the applied magnetic field.

3. The apparatus of claim 2 wherein said plurality of collection plates extends substantially beyond the ionization region in the direction of the particle flow to intercept the ionized particles changed in flow direction by said magnetic field.

4. The apparatus of claim 1 further including:
   a plurality of separate chambers transverse to the path of said flow;
   a plurality of current plates around each of said plurality of chambers; and
   means for exciting each of said current paths to direct the applied magnetic field through said chambers in alternating directions in adjacent chambers.

5. The apparatus of claim 4 wherein said current paths include:
   a plurality of conducting plates separating said chambers;
   a plurality of thin electrical connections between first ledges of said plurality of plates; and
   a plurality of electrical connections from said plurality of plates at second edges to said exciting means;
   said plates providing electrical conduction between the electrical connections.

6. The apparatus of claim 5 wherein the distance between said electrical connections along said plates is not substantially greater than the dimension of said plates in the direction of said flow.

7. The apparatus of claim 5 wherein said plates include means for directing the circulation of said magnetic field around said plates through said plurality of chambers.

8. The apparatus of claim 7 wherein said directing means includes additional coils in said current paths at the ends of said plates.

9. The apparatus of claim 7 wherein said directing means includes a thickening of the ends of said plates.

10. The apparatus of claim 5 wherein said exciting means is operative to heat said electrical connections to melt particles of said flow thereon.

11. The apparatus of claim 5 including a further plurality of plates for collecting particles of said flow not changed in flow direction by the applied magnetic field and disposed at a point to respond to current in said current paths to reinforce the applied magnetic field.

12. The apparatus of claim 1 wherein said vapor flow is created by means for magnetically directing an energetic beam toward a surface of a material to produce vaporization thereof, and means are provided to isolate said magnetically directed beam from variations in said applied magnetic field.

13. Apparatus for separating particles on the basis of isotope type including:
   means for generating a flow of particles of plural isotope types;
   means for selectively ionizing particles of one isotope type in the particle flow by excitation of a selected absorption line;
   a plurality of elongated chambers placed edge to edge transverse to the particle flow;
   means for applying a magnetic field longitudinally through said chambers;
   means for generating a periodic signal;
   means responsive to said periodic signal for repetitively activating the ionizing means; and
   means responsive to said period signal for time varying the magnitude of the applied magnetic field to have a relatively low value during reptitive activation of said ionizing means and a relatively high value directly after each repeated activation of said ionizing means so as to reduce the Zeeman broadening of said selected absorption line.

14. The apparatus of claim 13 wherein said magnetic field applying means includes means for providing the magnetic field in alternating directions in adjacent chambers.

15. The apparatus of claim 13 wherein said varying means reduces the applied magnetic field before substantial accelerations of ions resulting from charge exchange reactions occur in the ionized particle flow.

16. In a system for isotope separation wherein particles of plural isotope types in a particle flow are subjected to isotopically selective ionization by pulsed photoexcitation of a selected absorption line, a method for separating the ionized particles comprising the steps of:
   applying a magnetic field to the flow of ionized particles to provide a change in the predetermined direction of flow of said ionized particles;
   time varying the applied magnetic field to be relatively low with reduced Zeeman broadening of the selected absorption line during pulsed photoexcitation and relatively high thereafter thereby to increase the selectivity of ionization of particles.

17. The method of claim 16 further including the step of intercepting the particles changed in direction of flow to provide collection thereof separate from the remaining constituents of said flow.

18. The method of claim 16 wherein said varying step further includes the step of rapidly increasing the applied magnetic field directly subsequent to selective ionization of said particles.

19. The method of claim 18 wherein the varying step includes the step of decreasing the applied magnetic field subsequent to changing the ionized particle flow direction before substantial accelerations of ions resulting from charge exchange reactions occur.

20. The method of claim 16 wherein the magnitude of the magnetic field during the interval between each pulse of ionization reaches a level which if applied during ionization would substantially impair the selectivity of ionization.

21. The method of claim 16 wherein said magnetic field applying step includes the step of applying said magnetic field in alaternating directions across a region of the flow of said particles beyond the point where isotopically selective ionization thereof occurs.

22. The method of claim 16 including the steps of:
providing said flow by magnetically directing energy to a surface of a material of said plural isotope types to produce a radially expanding vapor flow thereof from said surface;
said magnetic field applying step including the step of applying said magnetic field in a configuration which minimizes interference with the magnetically directed energy applied to said surface.

23. The method of claim 22 further including the step of isolating the magnetically directed energy from effects of said applied magnetic field.

24. The method of claim 16 further including the step of providing selective ionization of particles of said one isotope type by application of laser radiant energy of frequencies including the selected absorption line for particles of one isotope type.

25. In a system for isotope separation wherein an environment of flowing particles of plural isotope tyes exists, apparatus for separating one isotope type from the particle flow comprising:
means for applying radiant energy to the particle flow to produce selective ionization of the particles of the one isotope type;
means for applying a magnetic field to the particle flow to produce a deviation in the flow direction of the ionized particles; and
means operative in association with said radiant energy applying means and magnetic field providing means to cyclically time vary said magnetic field and repetitively apply said radiant energy generally at the times of minimum applied magnetic field for reduced Zeeman broadening of the absorption line for the particles of said particle flow in response to photon energies in the applied radiant energy.

* * * * *

UNITED STATES PATENT AND TRADEMARK OFFICE
CERTIFICATE OF CORRECTION

PATENT NO. : 3,953,731
DATED : April 27, 1976
INVENTOR(S) : Harold K. Forsen

It is certified that error appears in the above-identified patent and that said Letters Patent are hereby corrected as shown below:

Column 1, lines 21-22, "without substantial ionization of the $U_{238}$ isotopes." should read --without substantial ionization of the $U_{238}$ isotope or other isotopes.--.

Column 2, line 32, "electonric" should read --electronic--.

Column 5, line 18, "so-caled" should read --so-called--.

Column 5, lines 30-31, "generaly" should read --generally--.

Column 6, line 9, "derector" should read --detector--.

Column 6, line 12, "the laser pulse systems 22" should read --the laser pulse initiate systems 22--.

Column 8, line 36, "period" should read --periodic--.

Column 8, line 38, "reptitive" should read --repetitive--.

Column 9, line 17, "alaternating" should read --alternating--.

Column 10, line 11, "tyes" should read --type--.

Signed and Sealed this

Fifth Day of October 1976

[SEAL]

Attest:

RUTH C. MASON
Attesting Officer

C. MARSHALL DANN
Commissioner of Patents and Trademarks